United States Patent [19]

Chang

[11] Patent Number: 5,764,141
[45] Date of Patent: Jun. 9, 1998

[54] MOTOR VEHICLE WARNING SIGNAL LIGHT ASSEMBLY

[76] Inventor: Jih-Cheng Chang, No. 37, Nan Hai Rd., Taipei, Taiwan

[21] Appl. No.: 796,560

[22] Filed: Feb. 6, 1997

[51] Int. Cl.⁶ ................................................. B60Q 1/52
[52] U.S. Cl. ................... 340/472; 340/458; 340/465; 340/467; 340/475; 340/479; 362/61; 307/10.8
[58] Field of Search .................. 340/458, 463–479, 340/815.73, 815.45; 362/61, 71, 78; 307/10.8

[56] References Cited

U.S. PATENT DOCUMENTS

| | | | |
|---|---|---|---|
| 4,825,191 | 4/1989 | Ching-Hwei | 340/479 |
| 4,835,515 | 5/1989 | McDermott et al. | 340/472 |
| 4,885,567 | 12/1989 | Katz | 340/474 |
| 4,896,137 | 1/1990 | Lee, III et al. | 340/479 |
| 5,041,813 | 8/1991 | Chang | 340/472 |
| 5,126,926 | 6/1992 | Chaing Wen | 340/479 |
| 5,311,412 | 5/1994 | Yang | 340/479 |

*Primary Examiner*—Thomas J. Mullen, Jr.
*Assistant Examiner*—Daniel J. Wu
*Attorney, Agent, or Firm*—Bacon & Thomas

[57] ABSTRACT

A motor vehicle warning signal light assembly is installed within a car and near a back window, which includes stop signal light, an invertedly disposed V-shaped signal light, a control switch, a leftward turn signal light, and a rightward turn signal light. The stop signal light is synchronously operated with the stop lights of the motor vehicle. The invertedly disposed V-shaped signal light and the stop signal light form a triangle signal light, which can be manually turned on by the control switch. The leftward turn signal light and the rightward turn signal light of the assembly are respectively operated with the leftward turn signal light and rightward turn signal light of the motor vehicle.

7 Claims, 2 Drawing Sheets

MOTOR VEHICLE WARNING SIGNAL LIGHT ASSEMBLY

BACKGROUND OF THE INVENTION

The present invention relates to a motor vehicle warning signal light assembly, and more particularly to such a warning signal light assembly that can be operated to produce a stop signal, a directional signal, and an emergency warning signal.

In case of emergency when driving a motor vehicle in snow or on a high way, the driver may usually step on the brake pedal to turn on the stop lights and/or switch on the leftward turn signal light and rightward turn signal light to flash. However, the drivers of the motor vehicles coming from behind may be unable to know the actual meaning of the mentioned signals, or may not easily pay attention to them all of sudden. Therefore, a traffic accident may occur under such a situation. Further, a motor vehicle driver may put a triangle sign behind the car in case of emergency to give a warning signal later. Therefore, after the emergent situation has been eliminated, the motor vehicle driver may forget to pick up the triangle sign and to take it back to the motor vehicle. As a matter of fact, leaving a warning sign on the road will disturb the traffic. In addition, regular triangle signs cannot reflect light effectively and properly during a bad weather for example when raining, or even cannot be prominently seen by the drivers of motor lorries and vans (motor trucks). Therefore, regular triangle signs produce little effect in many urgent situations.

SUMMARY OF THE INVENTION

The main object of the present invention is to provide a motor vehicle warning signal light assembly on the near window that can be immediately used to give a clear warning signal in case of emergency and, that can be controlled to produce different signals in corresponding conditions without being affected by the weather or other seasons. The motor vehicle warning signal light assembly of the present invention is comprised of a stop signal light, a V-shaped signal light, a control switch, a leftward turn signal light, and a rightward turn signal light. The stop signal light is mounted inside the motor vehicle behind the rear window, and synchronously operated with the stop lights of the motor vehicle. The V-shaped signal light is invertedly disposed above the stop signal light, and simultaneously connected with the stop signal light of the assembly by the control switch. Therefore, the V-shaped signal light and the stop signal light form a triangle signal light for use in an emergency. The leftward turn signal light and the rightward turn signal light of the assembly are respectively connected to the leftward turn signal light and rightward turn signal light of the motor vehicle. In other words, the leftward (rightward) turn signal light of the motor vehicle warning signal light assembly is synchronously operated with the leftward (rightward) turn signal light of the motor vehicle. The warning signal light could be light emitting diodes, electroluminescent lamps, luminescent devices, and etc. The necessary power supply of the assembly is obtained from the car battery of the motor vehicle.

DETAILED DESCRIPTION OF THE PREFERRED EMBODIMENT

Figure 1:
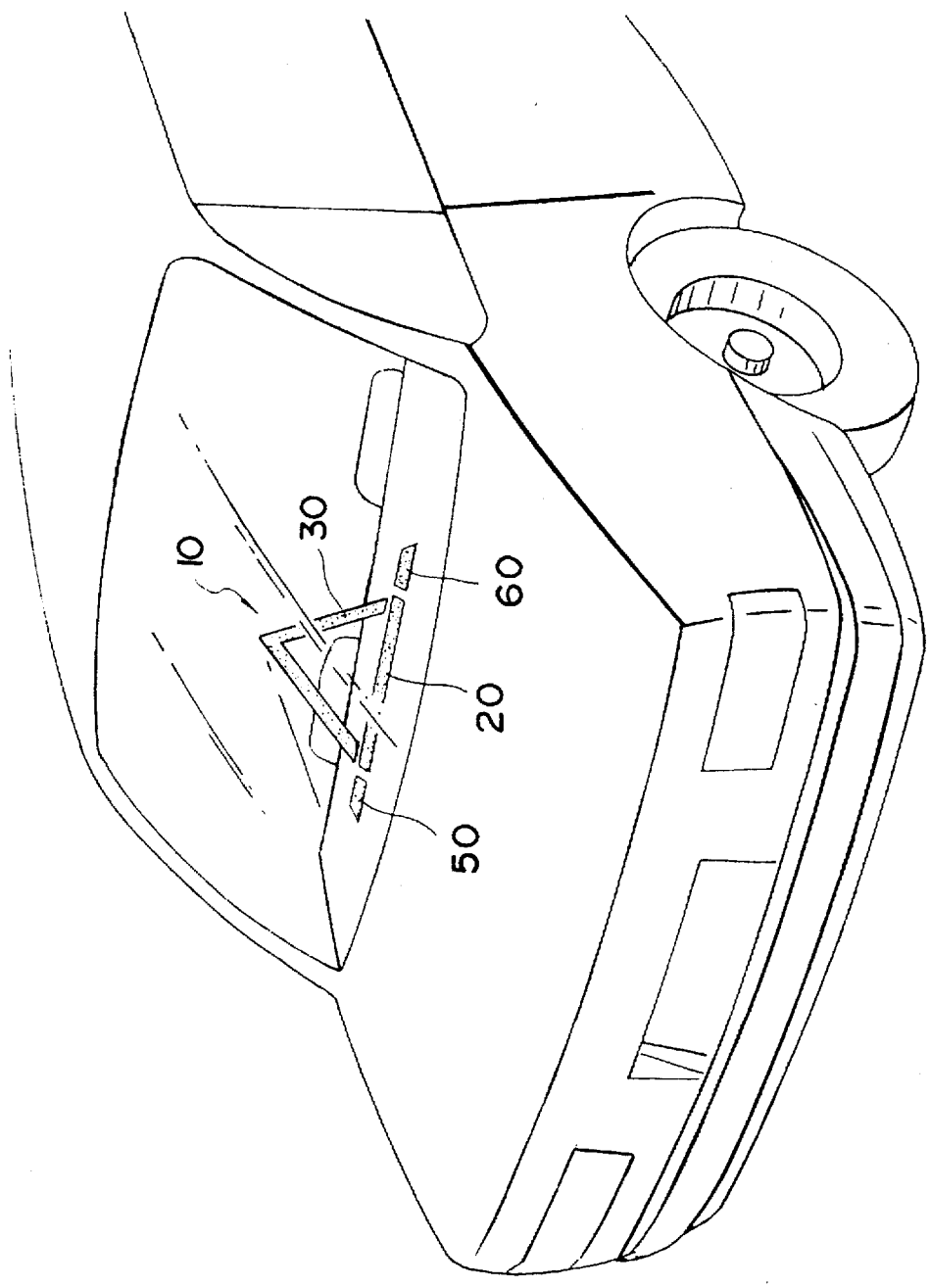
FIG. 1 shows a motor vehicle warning signal light assembly installed in a motor vehicle behind the rear window.
Figure 2:
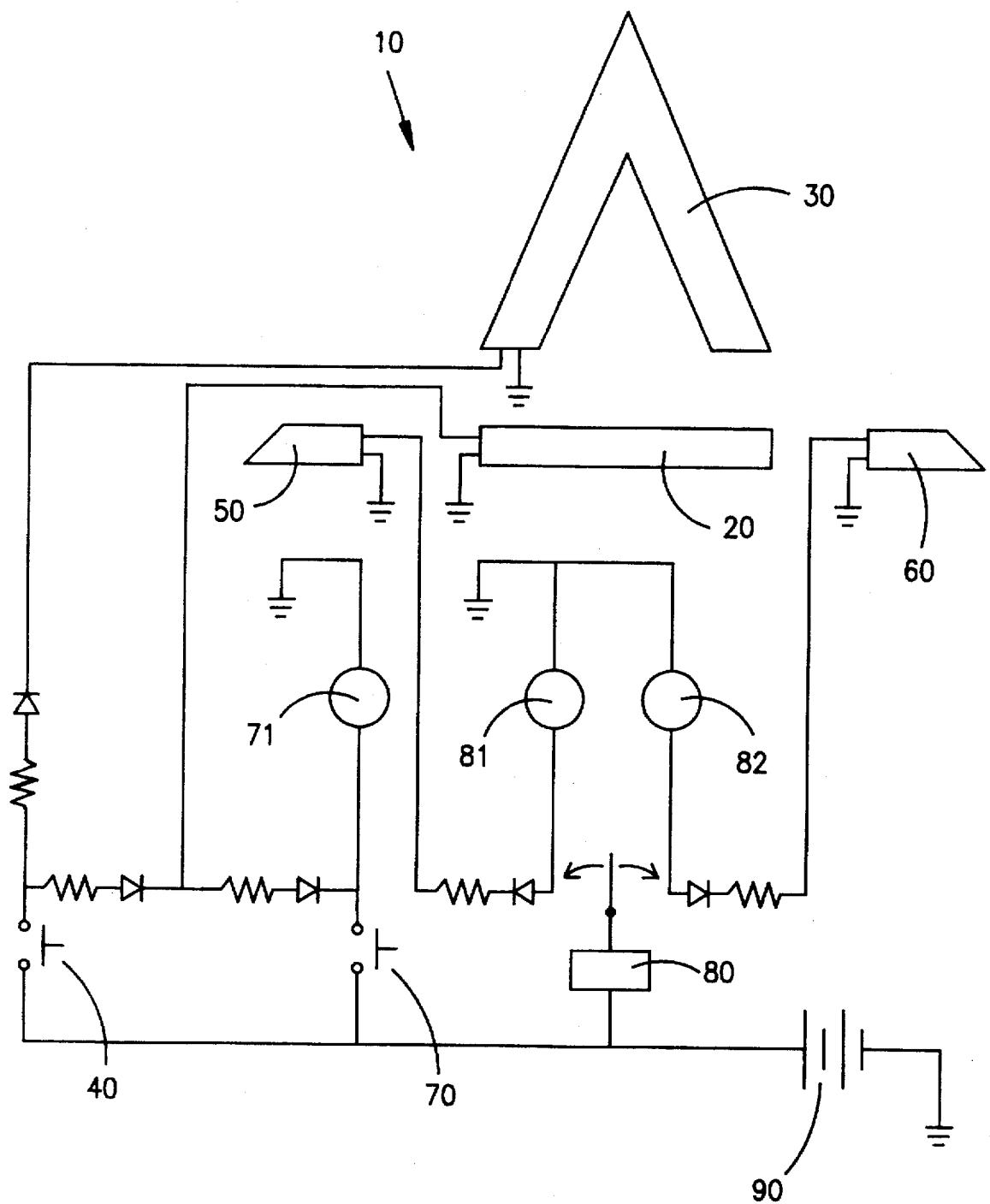
FIG. 2 is a circuit diagram of the present invention.

Referring to FIG. 1 and FIG. 2, a motor vehicle warning signal light assembly 10 in accordance with the present invention comprises a stop signal light 20, an invertedly disposed V-shaped signal light 30, a control switch 40, a leftward turn signal light 50, and a rightward turn signal light 60.

Referring to FIG. 2, the necessary power supply for the motor vehicle warning signal light assembly 10 is obtained from the car battery 90 of the motor vehicle. The stop signal light 20 is connected to the stop lights 71 of the motor vehicle. When the brake pedal 70 of the motor vehicle is stepped on, the stop lights 71 of the motor vehicle and the stop signal light 20 of the motor vehicle warning signal light assembly 10 are synchronously turned on. On the contrary, when the brake pedal 70 is released, the stop lights 71 and the stop signal light 20 are synchronously turned off. The V-shaped signal light 30 is invertedly disposed above the elongated stop signal light 20, therefore the V-shaped signal light 30 and the stop signal light 20 form a warning triangle signal light.

The control switch 40 controls the V-shaped signal light 30 and the stop signal light 20 independently without being affected by the brake pedal 70. Therefore, when in an emergency, the control switch 40 is manually operated to turn on the V-shaped signal light 30 and the stop signal light 20, causing the V-shaped signal light 30 and the stop signal light 20 to give a warning signal to vehicles coming from behind.

The leftward turn signal light 50 is connected to the leftward turn signal light 81 of the motor vehicle. When the leftward turn signal light 81 is controlled by the flash control device 80 of the motor vehicle to flash, the leftward turn signal light 50 of the motor vehicle warning signal light assembly 10 is synchronously driven to flash.

The right turn signal light 60 is connected To the rightward turn signal light 82 of the motor vehicle. When the rightward turn signal light 82 is controlled by the flash control device 80 of the motor vehicle to flash, the rightward turn signal light 60 of the motor vehicle warning signal light assembly 10 is synchronously driven to flash.

Referring To FIG. 1 again, when in use, the motor vehicle warning signal light assembly 10 is mounted within the motor vehicle behind the rear window to serve as a third stop light. When in an emergency, the V-shaped signal light 30 and the stop signal light 20 are simultaneously turned on to give a warning signal to vehicles coming from behind. Further, when the motor vehicle is turned leftwards or rightwards, the leftward turn signal light 50 or rightward turn signal light 60 of the motor vehicle warning signal light assembly 10 is synchronously driven to flash.

While only one embodiment of the present invention has been shown and described, it will be understood that various modifications and changes could be made thereunto without departing from the spirit and scope of the invention disclosed.

What the invention claimed is:

1. A motor vehicle warning signal light assembly mounted within a motor vehicle behind a rear window thereof, comprising:

an elongated stop signal light synchronously operated with stop lights of the motor vehicle;

an inverted V-shaped signal light disposed above said elongated stop signal light and forming with said elongated stop signal light a triangle signal light, the inverted V-shaped signal light being located in a fixed position relative to the elongated stop signal light;

a manual control switch electrically connecting said elongated stop signal light and said V-shaped signal light;

a leftward turn signal light disposed adjacent to a left side of said elongated stop signal light and synchronously operated with a leftward turn signal light of the motor vehicle; and, a rightward turn signal light disposed adjacent to a right side of said elongated stop signal light and synchronously operated with a rightward turn signal light of the motor vehicle.

2. The motor vehicle warning signal light assembly of claim 1 in which the stop signal light, the inverted V-shaped signal light, the leftward turn signal light and the rightward turn signal light are powered by a car battery of the motor vehicle.

3. The motor vehicle warning signa light assembly of claim 1 wherein said elongated stop signal light and said inverted V-shaped signal light are synchronously controlled by said manual control switch so as to be independent of operation of a brake pedal of the motor vehicle.

4. The motor vehicle warning signal light assembly of claim 1 wherein said stop signal light, said inverted V-shaped signal light, said leftward turn signal light and said rightward turn signal light are respectively formed of light emitting diodes.

5. The motor vehicle warning signal light assembly of claim 1 wherein said stop signal light, said inverted V-shaped signal light, said leftward turn signal light and said rightward turn signal light are respectively formed of electroluminescent lamps.

6. The motor vehicle warning signal light assembly of claim 1 wherein said stop signal light, said inverted V-shaped signal light, said leftward turn signal and said rightward turn signal light are respectively formed of luminescent devices.

7. The motor vehicle warning signal light assembly of claim 1 wherein said inverted V-shaped signal light is comprised of two elongated light emitting devices connected into an inverted V-shape.

* * * * *